Sept. 11, 1956 W. T. DAVIS 2,762,544
MACHINE FOR APPLYING SCREW CLOSURES TO COLLAPSIBLE TUBES
Filed Nov. 26, 1952 4 Sheets-Sheet 1

INVENTOR.
Walter T. Davis.
by Christy, Parmelee, Strickland
ATTORNEYS

Sept. 11, 1956   W. T. DAVIS   2,762,544
MACHINE FOR APPLYING SCREW CLOSURES TO COLLAPSIBLE TUBES
Filed Nov. 26, 1952   4 Sheets-Sheet 2

INVENTOR.
Walter T. Davis.
by Christy, Parmelee & Strickland
ATTORNEYS.

Sept. 11, 1956    W. T. DAVIS    2,762,544
MACHINE FOR APPLYING SCREW CLOSURES TO COLLAPSIBLE TUBES
Filed Nov. 26, 1952    4 Sheets-Sheet 3

INVENTOR.
Walter T. Davis.
by Christy, Parmelee & Strickland
ATTORNEYS:-

Sept. 11, 1956 W. T. DAVIS 2,762,544
MACHINE FOR APPLYING SCREW CLOSURES TO COLLAPSIBLE TUBES
Filed Nov. 26, 1952 4 Sheets-Sheet 4
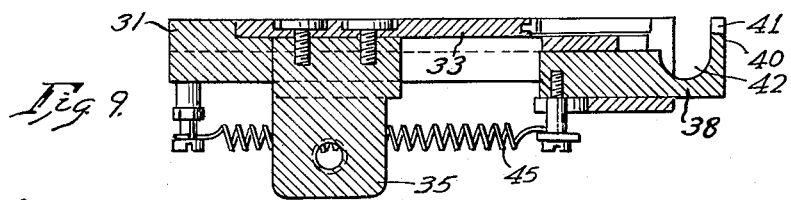
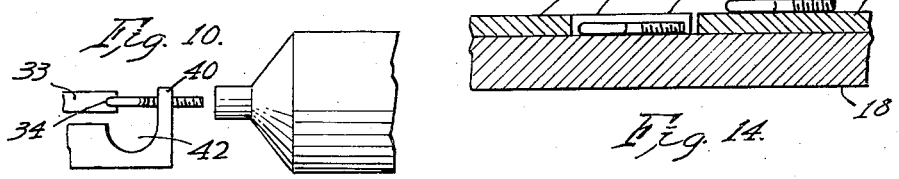
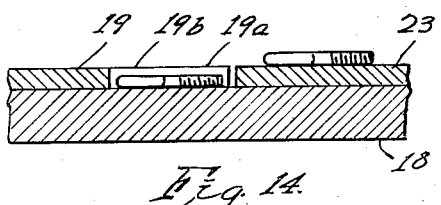
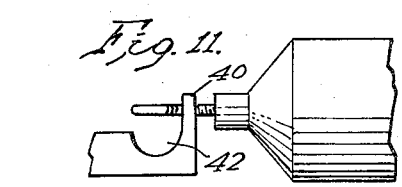
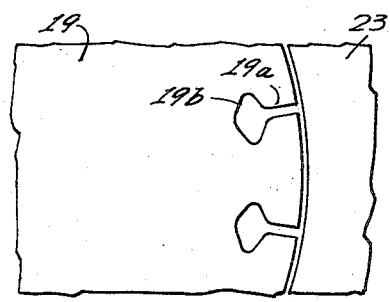
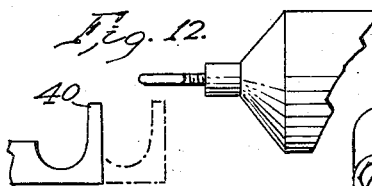
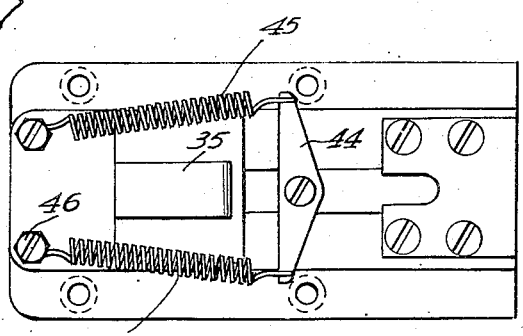
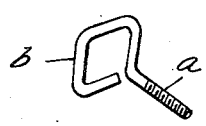
INVENTOR.
Walter T. Davis.
by
Christy, Parmelee + Strickland
ATTORNEYS:-

United States Patent Office 2,762,544
Patented Sept. 11, 1956

2,762,544

MACHINE FOR APPLYING SCREW CLOSURES TO COLLAPSIBLE TUBES

Walter T. Davis, Wheeling, W. Va., assignor to Wheeling Stamping Company, Wheeling, W. Va., a corporation of West Virginia Application November 26, 1952, Serial No. 322,749

8 Claims. (Cl. 226—88)

This invention is for a machine for applying screw-threaded closures to containers such as collapsible tubes, and is for a machine for this purpose of unique construction designed primarily but not necessarily for use with machines now in use which effect other operations on collapsible tubes.

Collapsible tubes used for various types of cements, adhesives, glue, as well as other products, often have a closure in the form of a screw eye which is threaded into the soft metal neck of the tube, and which is designed to be more easily removed than the conventional plastic cap commonly used on tooth paste and cosmetic tubes, since a substance such as cement is likely to make it very difficult to remove the usual plastic cap. The usual practice requires that these screw eye closures be inserted by hand, which is a slow, expensive, and time-consuming procedure, especially in view of the fragile nature of the empty tubes and the possibility of damaging them. The closures of course are applied to the tubes as a part of their manufacture, and the tubes are filled from the open end and sealed after they are otherwise complete.

The present invention has for its object to provide a mechanism which will apply closures of this type to collapsible tubes or similar containers, and moreover to make such a mechanism which can be used with a conventional multiple spindle tube trimming or tube decorating machine.

A further object of the invention is to provide a machine of unique construction which will assure of the closures being properly applied to each tube speedily and automatically, and in conjunction with such mechanism there is provided a novel chuck arrangement for supporting the screw eyes and threading them into the necks of the tubes.

According to the present invention there is provided in conjunction with a turret machine having a plurality of spindles or mandrels which are moved step-by-step through a cycle of stations, a turntable which is operated in synchronism with the turret of the machine. The screw eye closures are initially positioned in suitable notches in the periphery of this turntable. At a position opposite one of the stations of the mandrels on the turret, the closures are dropped from the turntable one at a time into a chuck which holds the closure stationary, while the tube on its mandrel is rotated. The closure is pressed by the operation of the chuck against the end of the tube and after it has been threaded a sufficient distance into the tube it is released so that it may rotate with the tube, and when the turret moves to bring the next-succeeding spindle in position, the tube to which the closure has been applied disengages from the chuck mechanism, and the chuck is restored to its starting position to repeat its cycle of operation.

My invention may be more fully understood by reference to the accompanying drawings, in which:

Fig. 9 is a longitudinal section in the plane of line IX—IX of Fig. 8, the view being similar to Fig. 7, but with the part in the different position;

Figs. 10, 11 and 12 are more or less schematic views showing the relation of the chuck to the spindle of the machine at the three positions of the chuck represented in Figs. 5, 7 and 9;

Fig. 13 is a perspective view of one of the closures which the present machine is designed to apply;

Fig. 14 is a fragmentary section in the plane of line XIV—XIV of Fig. 1, showing the relation of the disk and its closure-receiving recesses to the adjacent table and underlying supporting plate;

Fig. 15 is a fragmentary top plan view of a portion of the disk and adjacent table; and Fig. 16 is a bottom plan view of the chuck.

Figure 1:
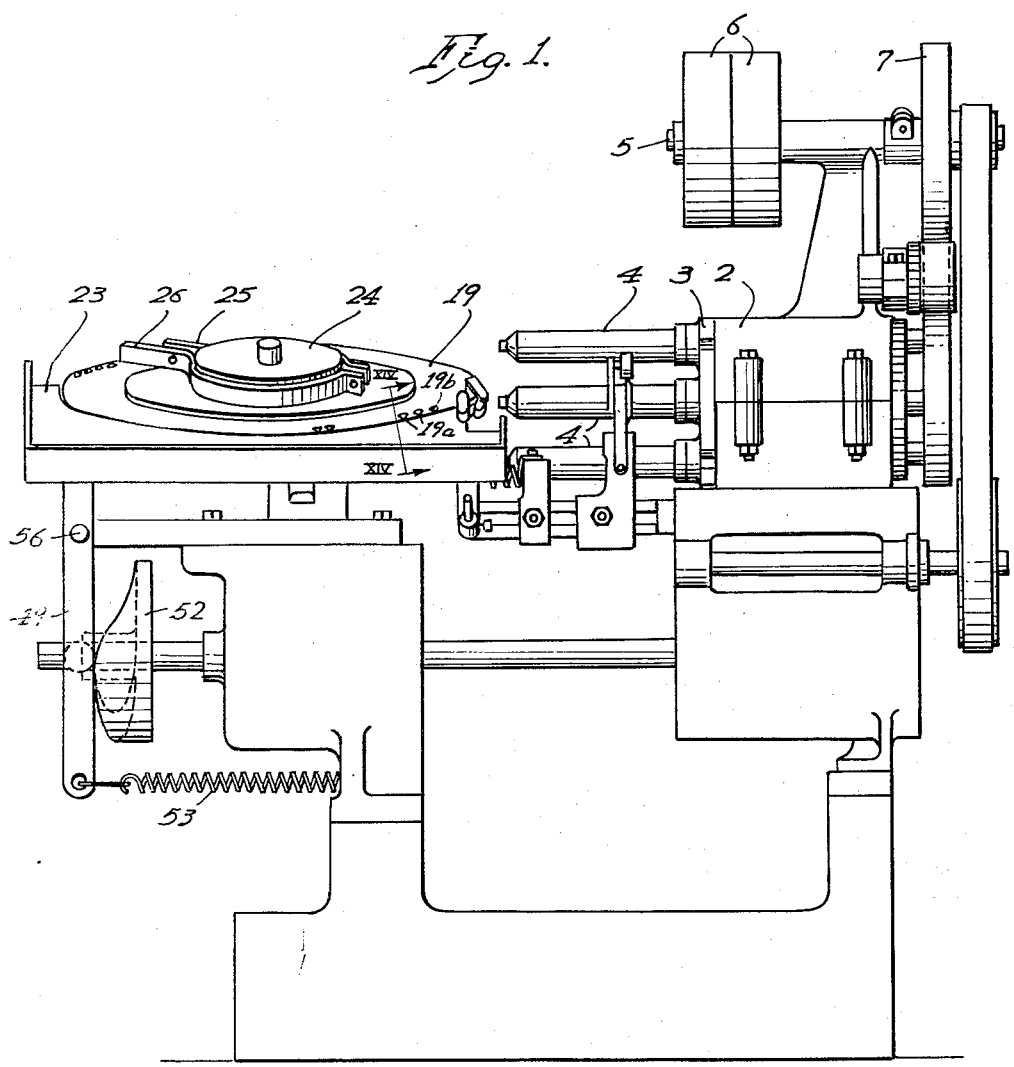
Fig. 1 is a side elevation of a machine embodying my invention.

In the drawings, 2 designates generally a collapsible tube-threading machine of the type shown, for example, in my prior Patent No. 1,678,463, but with the cap-applying mechanism of that patent removed. The machine 2 has a turret 3 from which project a circular series of equally-spaced mandrels or spindles 4. The machine is here shown as having a drive shaft 5 with a drive pulley and idle pulley of the conventional form designated 6, and on which is a main drive gear 7. This gear 7 drives a train of gears including a Geneva mechanism for rotating the turret 3 in a step-by-step movement. The gearing also includes planetary gears which cause the spindles themselves to rotate on the turret at one or more of the different stations. The Geneva gear and planetary gears are well known, machines of this type being in wide use, and constituting no part per se of the present invention.

The drive shaft 5 also operates through a belt or gearing shaft 8, which is to one side of the turrent and projects forwardly beyond the turret. It is continuously operated at a predetermined speed in reference to the operation of the turret. Specifically, it makes one revolution for each step in the rotation of the turret.

Figure 2:
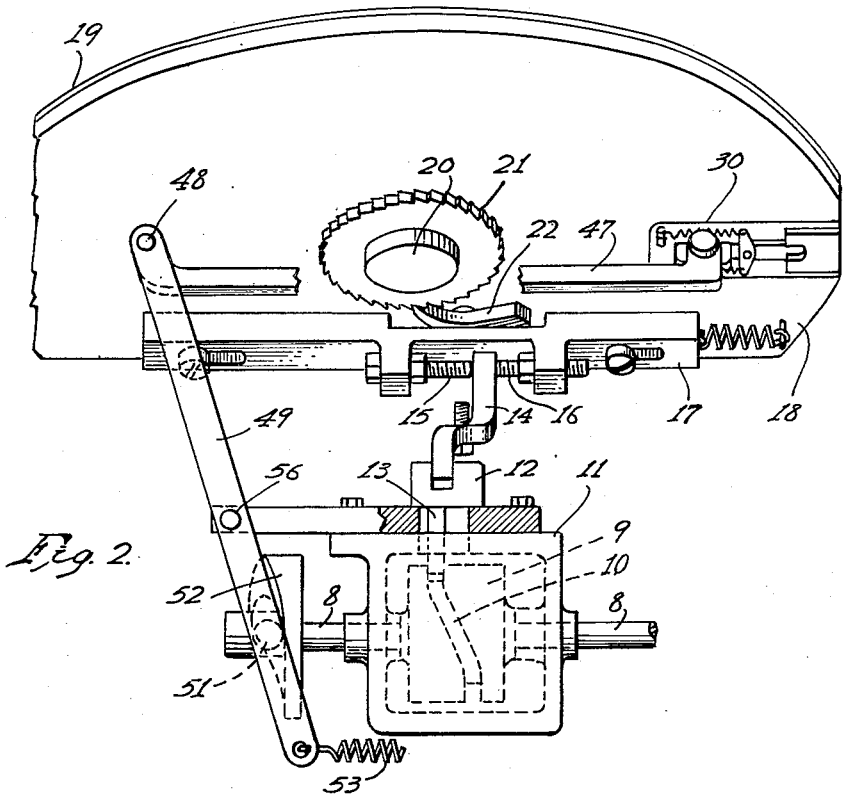
Fig. 2 is a plan view of the under side of the revolving table showing the mechanism for turning the table and the mechanism for operating the chuck.
Figure 3:
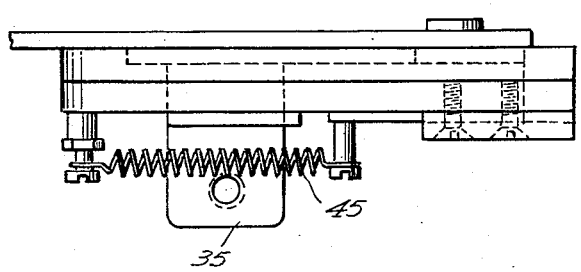
Fig. 3 is a side elevation of the chuck itself.

On the shaft 8 is a drum cam 9 having a cam groove 10 in its periphery. This cam is contained within a housing 11. On top of the housing 11 there is a slide 12 having a follower 13 that projects into the cam groove 10 by means of which the slide 12 is reciprocated in a direction parallel with the longitudinal axis of the machine. Projecting upwardly from the slide 12 is a rigid arm 14 which projects between adjustable screws 15 and 16 mounted in lugs that extend downwardly from a slide bar 17 secured to the under face of a supporting plate 18 (see Fig. 2), which supporting plate is set at an angle in front of the spindles on the turret.

On top of the supporting plate 18 is a disk 19 of relatively large diameter, this disk also being inclined crosswise of the machine, and it is provided with a central shaft 20 that projects through the table 18 and which has a ratchet wheel 21 thereon on the under side of the table.

The slide 17 is provided with a pawl 22 designed to rotate the ratchet wheel when the slide moves in one direction, and to ride over the ratchet teeth when the slide moves in the opposite direction. In the machine illustrated in Fig. 1, the ratchet teeth are arranged to effect the counter-clockwise rotation of the disk 19. The adjusting screws 15 and 16 enable the movement of the slide and its position with respect to the ratchet wheel 21 to be accurately adjusted.

The disk 19 is a relatively thin rolled steel disk of approximately one-eighth inch thickness, and around its periphery is a series of equally-spaced notches or openings which conform substantially to the shape of the screw eye closures to be inserted in the tube. As shown in Fig. 13, this closure has a threaded shank $a$ and a key or eye portion $b$. The head of the key or eye is preferably of a generally diamond shape instead of being circular as is the more conventional screw eye, but this is largely a matter of choice. The notches in the disk 19 (Figs. 14 and 15) have a narrow neck at the periphery of the disk designated 19a, and the length of this slit 19a is approximately equal to the length of the shank of the screw eye. The slot 19a opens into a larger opening 19b which is designed to easily accommodate the head or eye of the closure.

Around part of the periphery of the disk there is a table 23 that is flush with the surface of the disk. The closures are dumped onto this table and one of the machine attendants slides them with her hand onto the flat surface of the disk, and they fall into the openings in the periphery of the disks. The closures are thus arranged with their threaded ends projecting toward the periphery of the disk, and with the heads or eyes in the openings provided for them. They cannot drop through the openings because of the table 18 being under the disk 19. This is shown in detail in Fig. 14.

The disk 19 has at its center a raised drum 24. An adjustable friction band 25 is fitted around the drum and supported on an arm 26 to a stationary bracket (not shown) on the frame of the machine. This provides a friction brake that prevents the disk 19 from moving freely, or from overriding when it is moved.

In operation the stroke of the slide 17 on the under side of the supporting table 18 is adjusted so as to advance the disk on each cycle of operation a distance equal to the distance from the center of one closure-receiving notch to the center of another closure-receiving notch. In this way the disk 19 is moved step-by-step to carry the keys around to the key-applying position.

The disk and associated parts are juxtaposed to the ends of the spindles, and in one of its stations the axis of the spindle is substantially in alignment with the diameter of the disk 19, and there is a very close space between the end of this spindle and the periphery of the disk. At this position of the disk, the underlying table 18 is cut away, allowing the closure to fall from the recesses as it moves over the cut-away area into the underlying chuck mechanism which is designated generally as 30.

Figure 5:
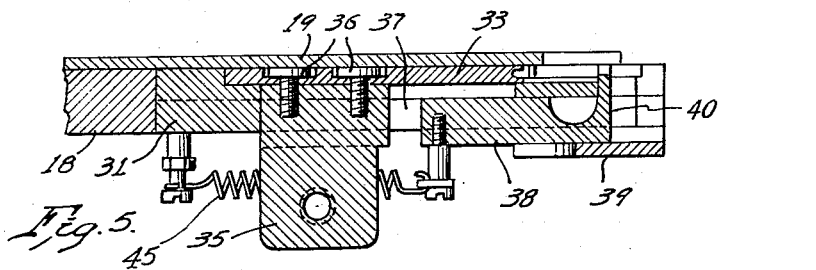
Fig. 5 is a longitudinal section through the chuck with the parts in the position shown in Figs. 3 and 4.
Figure 6:
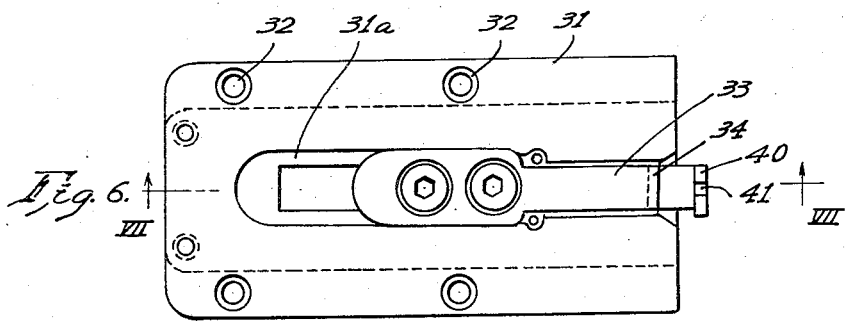
Fig. 6 is a plan view similar to Fig. 4 showing the parts in the position that they assume at the end of the closure-applying operation.
Figure 7:
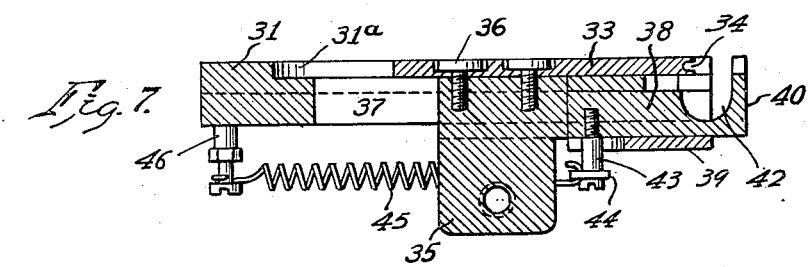
Fig. 7 is a longitudinal section in the plane of line VII—VII of Fig. 6, the view being similar to Fig. 5, but showing the different position of the parts.
Figure 8:
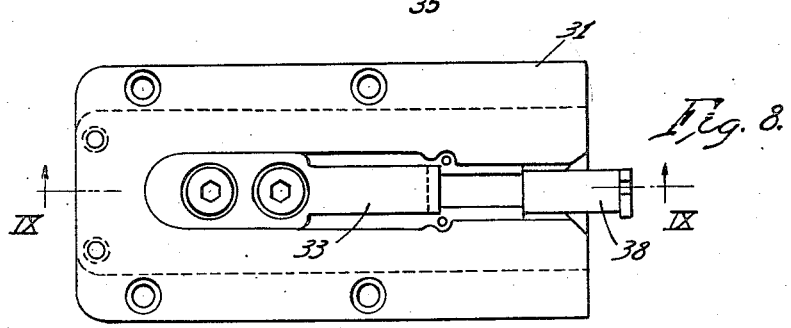
Fig. 8 is a view similar to Fig. 6, showing the next position of the chuck parts just before the closure is finally disengaged from the chuck.

The chuck or holding device which is most fully shown in Figs. 5 to 9 and 16, comprises a block of metal 31 designed to be held in place on the under side of the support 18 by means of screws (not shown) that pass through the holes 32 (see Fig. 6). As previously pointed out, the support 18 immediately overlying the center of this block is cut away as best shown in Fig. 5. Formed in the top surface of the block 31 is a shallow groove or channel 31a in which there is a slidable pusher plate 33 having a transverse groove 34 in its outer end. The end of this pusher is in effect one jaw or gripping member of the chuck assembly. A downwardly-projecting ear or lug 35 is secured to the under side of the slide or pusher plate 33, machine screws 36 being shown for the purpose of securing the lug to the slide plate. The groove, designated 31a in the top of the block surface, is a guide for the plate 33. The block 31 has a slot 37 therethrough through which the lug 35 projects, and along which it can move. There is a second supporting slide 38 mounted in the slot 37 in the block 31, and which is retained in position by a bridge-like keeper plate 39. The slide 38 has at its forward end an upstanding tongue 40 in which is a central notch 41, and behind the tongue 40 is a concavity 42. This tongue, confronting the end of the slide 33 and spaced from it, is the other jaw or gripping element of the chuck. There is a pin 43 secured to this second slide 38 back of the bridge 39. This pin 43 has an equalizer bar 44 (see Fig. 16) thereon, to which are connected two tension springs 45. These tension springs have their opposite ends anchored to stationary posts 46 secured to the block.

The chuck is operated by means of a link 47 (see Fig. 2) which extends under the supporting table 18, and which has one end pivotally connected to the ear or lug 35 on the under side of the slide or pusher plate 33, and it has its other end pivotally connected at 48 to the upper end of a rocking lever 49, which lever is pivotally supported at 50, and which has a cam follower 51 thereon. This cam follower 51 engages the face of a cam disk 52 having a simple cam surface on one face thereof, the cam 52 being fast on the shaft 8 so that the cam makes one rotation with each cycle of operation of the cam 9 and the parts actuated thereby. A tension spring 53 acts in opposition to the cam and holds the cam follower 51 in contact with the face of the cam.

The operation of the machine may now be followed. By reason of the shaft 8 being driven through the same mechanism that drives the turret 3 with its spindles 4, the operation of the closure applying device is necessarily synchronized to the operation of the turret. Assuming that the turret as viewed in Fig. 1 is rotating in a counterclockwise direction, as viewed by one looking in toward the free ends of the spindles, it may be assumed that the lowermost spindle will be carried on the next step-by-step movement of the turret to the mid position shown in Fig. 1. As each spindle is thus moving up through a quarter turn of the turret, the cam 9, operating through the associated mechanism, including the pawl 22, will advance the disk 19 a distance of one notch.

Figure 4:
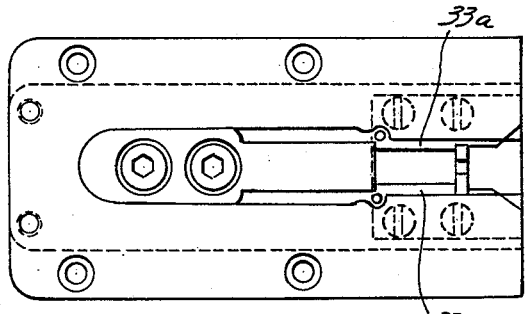
Fig. 4 is a top plan view thereof, showing it detached from the table.

An operator seated in front of the machine slides the screw eye closures over the table 23 in such manner as to cause them to drop into the notches of the rotating table 19. When a notch containing a screw eye closure moves over the chuck, the parts of the chuck will at that time be in the position shown in Fig. 5, and the closure will drop horizontally out of the revolving disk through the openings provided in the supporting plate 18 into the chuck. It will be in approximately the position shown in Fig. 10 with the shank of the screw eye supported in the notch 41 of the tongue 40, while the eye or head of the closure will rest on the ledges 33a (see Fig. 4), at each side of the guideway along which the slide 33 moves. When the key has thus fallen into the chuck, the cam 52 will be effective to move the link 47 to the right as viewed in Fig. 2, causing the slide 33, as viewed in Fig. 5, to advance toward the right, causing the eye or head of the closure to be engaged by the transverse groove 34 in the right-hand end of the slide. The closure will then be engaged in the manner shown in Fig. 10, being held from rotation by the end of the closure being received in the groove 34, but the threaded shank of the closure will project horizontally beyond the end of the tongue 40 of the chuck. As the link 47 continues to thrust toward the right, the slide 33 will then exert pressure through the closure and the tongue 40, to move the tongue 40 toward the right from the position shown in Fig. 10, and in such movement the piece 38 on which the tongue 40 is mounted moves against the tension of the springs 45. As the parts 34 and 40 of the chuck thus move toward the end of the spindle on which the formed tube is already positioned, the free end of the shank of the closure will be pressed against the center of the neck of the tube. The spindle, and consequently the tube carried on the spindle, will be turning in this position, so that the closure which is held against turning will be screwed into the neck of the tube as best shown in Fig. 11. When the link 47 has moved to the right a sufficient distance to cause the closure to be threaded the desired depth into the neck of the tube, the motion of the link 47 will be reversed due to the contour of the cam 52, and the slide 33 will withdraw, releasing the head of the closure eye from the groove 34. As soon as the slide 34 has retracted and released the head of the closure, the closure may turn with the tube and thereby avoid stripping the threads which the closure forms in the soft metal constituting the neck of the tube. The recess 42 behind the tongue 40 provides adequate clearance for this rotation of the closure with the tube. The springs 45 during this opening of the closure are urging the piece 38 toward the left, but piece 38 is restrained due to the head of the closure being engaged behind the tongue 40 and the shank of the closure being in the notch 41. At this stage the Geneva gear will again turn the turret, and as shown in Fig. 12, the shank of the closure will be lifted out of the notch 40, whereupon the springs 45 will immediately turn the lock 38 with its tongue 40 to the starting position shown in Fig. 5. Fig. 12 shows the tongue 40 in the dotted line position which it occupied just before the closure was cleared from the notch 41, and the full line position shows it at the other limit of its travel. This operation takes place in an instant.

This operation of the chuck with the slide 33 and the tongue 40 being relatively movable, is most important to the successful operation of the machine. Of course as the piece returns to the position shown in Fig. 5, the table 19 will then advance to drop another key into the chuck and the operation will be repeated. Thus as the turret rotates step by step to successively present each spindle to a station adjacent to and confronting the chuck, the cam 9 will operate to feed a closure to the chuck, the chuck will operate to apply the closure, and the next movement of the turret finally clears the closure from the chuck so that the chuck can return to closure-receiving position in time to receive the next closure for the next spindle which is then moving into position.

As hereinabove indicated, the turret machines themselves form no part of the present invention, being generally known in the collapsible tube art as tube trimmers. The tubes are applied to the spindles of this machine and removed therefrom at a station or stations remote from the one where the closure is applied, as is well understood by those skilled in the art. The present invention involves the provision with such a trimmer or multiple spindle machine of a mechanism for applying a screw eye type of closure automatically to each tube as it is successively presented to a position adjacent to and confronting the chuck.

The closures are easily moved into the notches of the revolving disk. Their shape is such that they lie flat on the table 23, and the table is inclined slightly toward the operator so that she merely needs to slide the closures around with her hand, and since the surface of the disk is flush with the surface of the table, her hand cannot be hurt even though the table moves as she is sliding the closure into position.

In the accompanying drawings, I have shown and specifically described one embodiment of my invention, but it will be understood that these elements may be modified in various ways to conform to machine shop practice and production methods, and that various changes and modifications may be made in the construction and organization of the machine within the contemplation of my invention and under the scope of the appended claims.

I claim:

1. The combination with a collapsible tube machine having a turret with a plurality of mandrels and a drive which rotates the turret in steps to successively present the mandrels to a plurality of stations, of means juxtaposed to the mandrel end at one of said stations for applying a screw eye type of closure to a tube on the mandrel, said means comprising a chuck having opposed jaws movable toward and from the mandrel and relatively movable in the same direction with respect to each other, means for delivering the closures one at a time to the chuck, and means for operating the chuck and feed means in sequential relation to each other and in predetermined relation to the turret.

2. A collapsible tube machine as defined in claim 1 wherein the feeding means comprises a supporting plate, and a disk set upon and rotatable on the supporting plate, the disk having equally-spaced closure-receiving notches in its periphery, said notches each having a slit extending radially inwardly from the periphery of the disk and of just sufficient width to receive the shank of a screw eye closure and keep said shank radial to the center of the disk, the disk having a cut-out portion inwardly of the slit to receive the eye portion of the closure, means for rotating the disk in steps the distance of which is equal to the center-to-center spacing of the notches, the supporting plate being cut away at a position near the aforementioned station, the chuck being positioned under the disk at said position, whereby a closure may fall from the notch of the disk into the chuck.

3. A collapsible tube machine as defined in claim 2 wherein the chuck jaws are arranged to grasp the head of the closure in a direction parallel with the axis of the threaded shank and with the shank projecting beyond the chuck toward the turret, whereby the shank end of the closure may be projected against the end of a tube on the mandrel when the chuck is moved toward the mandrel.

4. A collapsible tube machine as defined in claim 3 wherein the relatively movable jaws are adapted to grasp the head of the closure, one jaw being positioned rearwardly of the other, and a lost motion connection through which the chuck is operated for moving the rear jaw in a direction away from the mandrel before the other jaw is so moved.

5. For use on a collapsible tube machine having a turret with a plurality of tube-holding mandrels, and means for intermittently moving the turret to progressively present the mandrels to different stations, and means for rotating the mandrels at selected stations, the herein defined apparatus for applying screw eye type closures to collapsible tubes while they are on the mandrels, comprising a chuck juxtaposed to the free end of the mandrel at one of said stations and having jaws which are relatively movable to gripping position in the direction of the axis of the shank of the closure, one of said jaws being bifurcated to straddle the shank of the closure, means for delivering a screw eye type of closure to said chuck, means in the chuck for holding said closures against free rotation with the threaded end of the closure protruding, means for advancing the chuck toward the end of the tube on the mandrel while the closure is so held to bring said protruding end of the closure into contact with the center of the tube neck whereby the shank of the closure is caused to screw into the neck of the tube and for withdrawing the chuck when the closure has been so applied.

6. A chuck as defined in claim 5 wherein the means in the chuck for holding the closure comprises relatively movable members which release the closure to permit it to rotate with the tube after it has been so applied to the tube and until the tube is carried by motion of the turret away from said station and the shank moved out of the bifurcated jaw.

7. In an apparatus for applying screw eye type closures to collapsible tubes, a chuck comprising a fixed support, forward and rear jaw elements mounted in the support having opposed surfaces between which the eye portion of the closure may be gripped with the shank of the closure projecting beyond the jaws, said jaws being reciprocable relatively to each other and to the support in a direction longitudinally of the jaws and of the axis of the shank of a screw eye closure when engaged between the jaws, said forward jaw element also having movement together with the rear jaw element, the rear jaw element having a range of movement greater than the forward jaw element, means for reciprocating the forward and rear jaw elements, extensible resilient means for resisting movement of the forward jaw element and returning it to its starting position when so moved, the eye of a closure when gripped between the jaws serving to transmit movement from the rear jaw element to the front jaw element against the resistance of said extensible resilient means.

8. The combination as defined in claim 7 wherein said jaw elements are in overlying relation, with the forward jaw element being below the rear jaw element and having a tongue which projects across the plane of travel of the rear jaw element.

References Cited in the file of this patent

UNITED STATES PATENTS

| | | |
|---|---|---|
| 302,282 | Pusch | July 22, 1884 |
| 1,678,463 | Davis | July 24, 1928 |
| 1,679,865 | Koingsberg | Aug. 7, 1928 |
| 1,748,961 | Risser | Mar. 4, 1930 |
| 2,284,690 | Stern | June 2, 1942 |
| 2,315,526 | Jordan | Apr. 6, 1943 |